J. C. COOK & C. E. WELEVER.
CYLINDER LUBRICATION.
APPLICATION FILED MAR. 18, 1911.

1,053,574.

Patented Feb. 18, 1913.

Witnesses:

Inventors:
Jay C. Cook,
Clarence E. Welever,
their attys.

UNITED STATES PATENT OFFICE.

JAY C. COOK AND CLARENCE E. WELEVER, OF PASADENA, CALIFORNIA.

CYLINDER LUBRICATION.

1,053,574.

Specification of Letters Patent.

Patented Feb. 18, 1913.

Application filed March 18, 1911. Serial No. 615,432.

*To all whom it may concern:*

Be it known that we, JAY C. COOK and CLARENCE E. WELEVER, both citizens of the United States, residing at Pasadena, in the county of Los Angeles and State of California, have invented new and useful Improvements in Cylinder Lubrication, of which the following is a specification.

This invention relates to the lubrication of cylinders and pistons of internal combustion engines, especially to that type wherein what is known as "the splash system of lubrication" is employed. In such systems of lubrication considerable difficulty is experienced by oil working above the piston and causing carbon to collect on the piston and valves, necessitating frequent regrinding of the valves and cleaning of the spark plugs. This deposit of carbon invariably results when too much oil is placed in the crank base. To avoid this it is customary to limit the amount of oil placed in the crank base and this requires, in many types of engines, the frequent replenishing of the oil, and the main object of the present invention is to prevent the oil from working above the piston and thereby avoid the formation of carbon referred to, thus eliminating all of the evils arising therefrom, such as loss of power, valve trouble, ignition trouble, etc., and to also enable a much larger supply of oil to be carried.

Our invention consists in providing one or more holes through the walls of the piston leading from a piston ring groove to the space in the interior of the piston which is in direct communication with the crank base, which permits any excessive oil which has worked up the walls of the cylinder and piston to pass inwardly through the holes and fall therefrom directly into the supply of oil in the crank base, the presence of the holes making it impossible for the excessive oil to pass above them.

Figure 1:
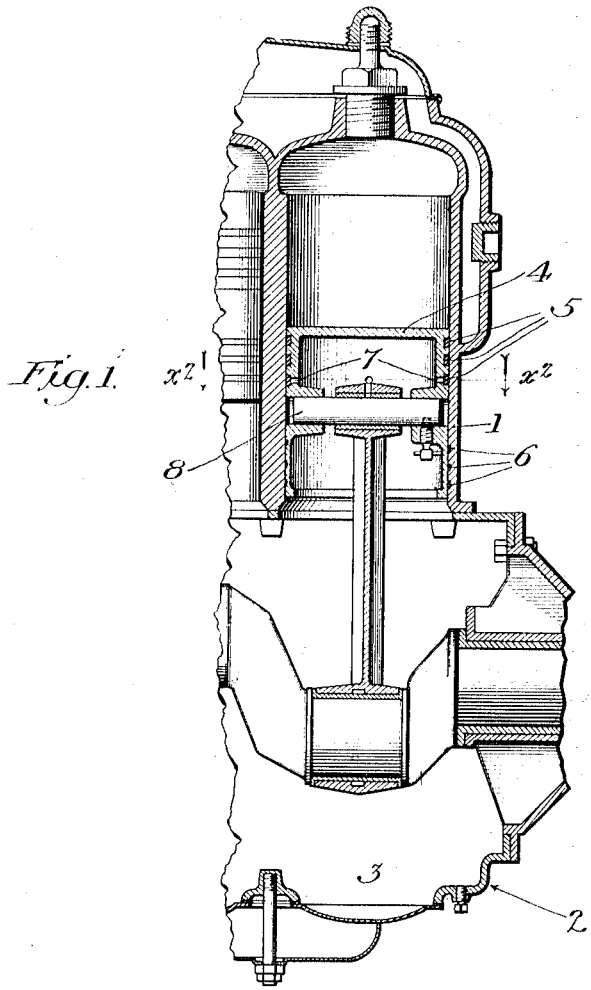
Figure 2:
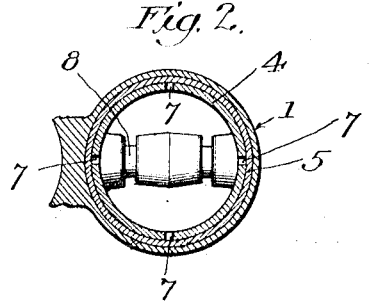

Referring to the drawings:—Figure 1 is a vertical section through a portion of an internal combustion engine, showing it constructed in accordance with our invention. Fig. 2 is a cross section on line $x^2$—$x^2$ Fig. 1.

1 designates a cylinder.

2 designates the crank base with oil supply 3.

4 designates the piston having piston rings 5 at the upper end thereof.

7 designates holes drilled through the wall of the piston and communicating with the bottom of the lower piston ring groove. The lower piston ring 6 serves to lift oil up into the cylinder at each upward stroke of the piston, and the oil which works up passes around the inner faces of the piston rings as the piston rings are expanded and fit tight against the cylinder walls, so that any excessive oil which reaches the lower piston ring 6 will arrive at the bottom of the groove in which that piston ring lies and will thus flow out through the holes 7 and drop back into the oil reservoir. This prevents any excess oil working above this point and prevents the formation of carbon before referred to.

In nearly all modern engines the internal diameter of the cylinders varies, the diameter being from three to seven thousandths of an inch less at the upper end of the stroke than at the lower end of the stroke, so that as the piston rises during compression the piston rings are contracted from three to seven thousandths of an inch, which gives them a tighter fit at the point where it is most needed for good compression. As the piston descends the rings expand gradually so that as the piston reciprocates there is a slight expansion and contraction of the piston rings which acts after the manner of a pump to force the oil from the piston ring groove through the perforations. Thus as the piston descends the ring expands and the oil, working around the inner face of the ring lodges in the groove in the piston behind the piston ring, and as the piston ascends the oil which has accumulated in this groove at the back of the ring is forced through the perforations by the piston ring as the latter is contracted and forced deeper into the groove.

Having provided means for returning an excess of oil after it has reached a given height, it is possible to increase the amount carried in the reservoir and thereby increase the oil capacity of the machine without causing any disadvantageous results. The perforations 7 being located at a point above the wrist pin 8 results in causing the wrist pin to be lubricated by the oil which passes out through the perforations 7.

What we claim is:—

A crank case, a cylinder thereon, a trunk piston in the cylinder, the piston having an annular groove and formed with perforations which extend from the inner wall of said groove to the open space within the piston, said space having direct communication with the crank case, and an imperforate split expansible piston ring in said groove whereby the expansion and contraction of the piston ring during the stroke of the piston causes the oil which works into said groove to be pumped by the radial movement of the piston ring caused by its expansion and contraction during the stroke of the piston through the perforations into the space within the piston and discharged to the crank case.

In testimony whereof, we have hereunto set our hands at Los Angeles California this 28 day of February 1911.

JAY C. COOK.
CLARENCE E. WELEVER.

Witnesses:
G. T. HACKLEY,
FRANK L. A. GRAHAM.